Nov. 21, 1967 H. E. CHANA 3,353,641
CLUTCH OR BRAKE UNIT
Filed Oct. 18, 1965

INVENTOR.
Howard E. Chana
BY
A. M. Heiter
ATTORNEY

United States Patent Office 3,353,641
Patented Nov. 21, 1967

3,353,641
CLUTCH OR BRAKE UNIT
Howard E. Chana, Flint, Mich., assignor to General Motors Corporation, Detroit, Mich., a corporation of Delaware
Filed Oct. 18, 1965, Ser. No. 497,335
12 Claims. (Cl. 192—85)

ABSTRACT OF THE DISCLOSURE

A clutch or brake having a plurality of friction plates selectively engageable to connect relatively rotatable members and including a pressure operated apply piston with an annular elastomeric cushion disposed in a groove in the face of the piston. As the plates are being engaged in response to piston apply operation, the cushion initially deflects to provide a gradually increasing spring rate and gradual plate loading permitting relative slippage of the friction plates. On continued application of the apply piston, the spring rate of the cushion rapidly increases with cushion deflection limited by the groove. Rapidly increasing apply force is then transmitted by the cushion to the friction plates to frictionally connect the plates so that they will not slip.

---

This invention relates to clutch or brake units and more particularly to an improved motor assembly for applying a cushioned mechanical load to the mutually-engageable friction members of such units, improving their static and dynamic operation for clutching and braking purposes.

Clutch and brake units, referred to generically as friction-drive-establishing devices in this application, have been reliably and successfully employed for many years to effect ratio change in multiratio power-transmitting units such as a planetary gear set. Generally, these devices include a piston or motor member which converts fluid pressure into a mechanical load for applying large forces to a plurality of friction members, frequently in the form of a friction disc pack, to condition the members for clutching or braking operation.

For soft shifts and improved performance the friction drive-establishing device should be desirably calibrated so that an initial low-apply load packs the friction plates in a manner to produce a dynamic condition in which there is controlled friction plate slippage, resulting in low torque capacity. On subsequent higher apply loads there is increasing close engagement of the plates and diminishing slippage until a point is reached where a static condition exists in which there is no slippage and high torque capacity.

To provide calibration of the capacity of the friction members and to cushion the impact of the piston on engagement of the friction members, coil and wave-type cushion springs have heretofore been positioned between the piston and the leading friction member. These prior cushion springs, while improving the operation and durability of clutch or brake units, often loaded the friction plates at multiple points when packed by operation of the piston. This results in unequal loading, wear and possible burn of the friction plates, detracting from the durability and smooth operation thereof.

This invention involves the incorporation in a friction-drive-establishing device of a continuous contact cushion of suitable elastomeric material readily deformable, and oil resistant, having a low modulus of elasticity which will not readily acquire a permanent set. This material provides a cushion located between the piston or motor means and the leading friction plate and provides for equal friction plate loading and flat-to-flat plate engagement reducing or eliminating uneven friction plate wear and plate burn. Furthermore, this invention includes an improved means for mounting the cushion in the piston which accommodates the displaced material of the cushion in a manner which substantially improves capacity calibration of the friction plate pack and which improves shift feel on ratio change.

An object of this invention is to provide a new and improved friction-drive-establishing device.

Another object of this invention is to provide new and improved cushioning structure between a motor and selectively-engageable friction members of a friction-drive-establishing device to provide equal loading and improved capacity calibration of the friction members.

Another object of this invention is to provide an elastomeric, readily-deformable cushion having a continuous flat contact surface between a motor and cooperating friction plates, in which the cushion deflects and initially transmits low load to the friction plates when engaged by the motor and subsequently transmits a rapidly-increasing load to the friction plates upon restraint of cushion deflection.

Another object of this invention is to provide a friction-drive-establishing device including a cushion between a motor means and friction members which improves calibration of the friction members by providing a low rate of increase of capacity for dynamic operation and a high rate of increase in capacity for static operation.

These and other objects and advantages will be apparent from the following description and drawing, in which.

Figure 1:
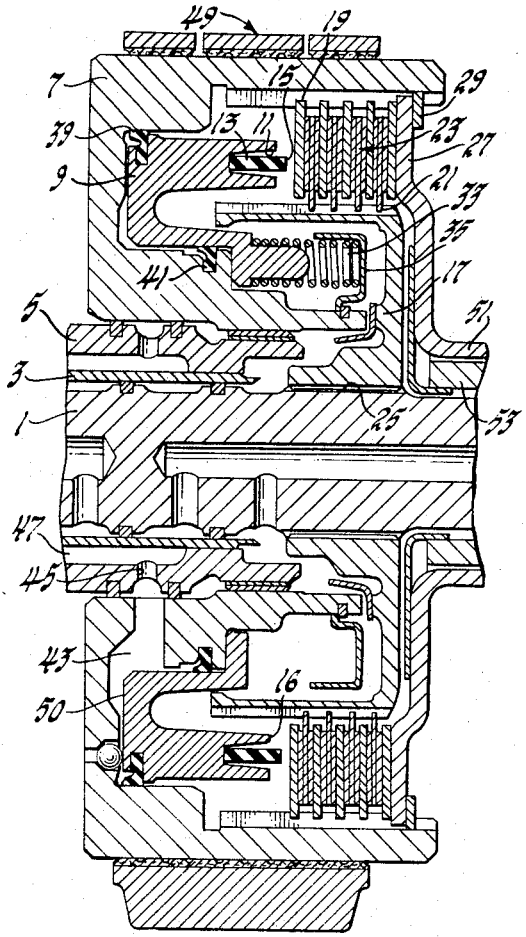
FIGURE 1 is a sectional view of a preferred embodiment of the invention.

Turning now to FIGURE 1, it will be seen that rotatable main shaft 1 extends through coaxial ground sleeve 3 and grounded support sleeve 5 for driving an input gear of a change ratio planetary gear set, not shown. The fixed support sleeve 5 supports an annular motor housing 7 in which an annular motor or piston 9 is mounted for longitudinal movement. The piston is preferably formed with an annular and inwardly-tapering groove 11 in which an annular cushion 13 is mounted. This cushion is preferably rectangular in cross section and formed from a readily-deformable, elastomeric material, such as polyacrylate rubber, Teflon-filled rubber, nylon-filled rubber or other rubber compounds which are capable of sustaining deformations without set and resist deterioration from petroleum products and heat, up to and in excess of 300° F., as well as having high wear-resisting characteristics. The outer apply face 15 of the cushion is substantially flat. As illustrated in FIGURE 1, the groove is considerably larger in width than the cushion when relaxed and has sufficient volume to contain the material when strained under load. In this latter position the apply face of the cushion is preferably coplanar with the outer face 16 of the piston.

Alternately splined to the interior of the housing 7 and to the outer portion of a support hub 17 are a series of friction discs 19–21 which cooperate to form a clutch pack 23 of a friction-drive-establishing device. The hub 17 is internally splined at 25 to the main shaft 1. As best shown in FIGURE 1, the clutch pack is backed by circular plate 27, splined to the housing 7 and secured thereto by retainer ring 29. Coil return springs 33, seated between release area of the piston and spring support 35, are used to return the piston to an off position as will be further explained below. The piston and piston housing and annular seals 39 and 41 form a pressure chamber 43 which is connected by passages 45 and 47 to a shift valve, not shown, that controls the supply of pressure oil to this chamber and to the apply area 50 of the piston under predetermined operating conditions.

Encompassing the exterior of housing 7 are brake bands 49 which, when applied by a servo, not shown, contact the exterior of the drum, retarding rotation thereof and accordingly the rotation of connected plate 27. It will be noted that the plate 27 has at its inner radius outwardly-extending fingers 51 which intermesh with the teeth of sun gear 53, thereby coupling housing 7 thereto. The sun gear 53 is part of the change ratio planetary gear set which forms no particular part of this invention.

Figure 2:
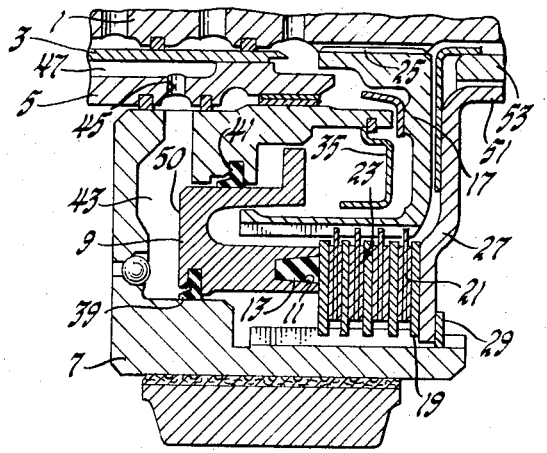
FIGURE 2 is a partial sectional view of a preferred embodiment of the invention.
Figure 3:
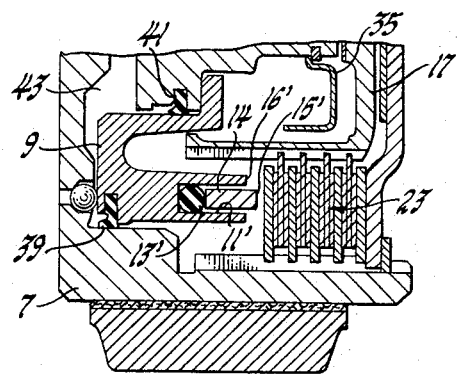
FIGURE 3 is a partial sectional view of another embodiment of the invention.
Figure 4:
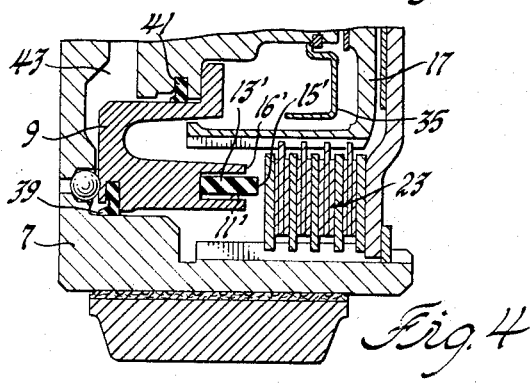
FIGURE 4 is a partial sectional view of another embodiment of the invention.

The embodiments of FIGURES 3 and 4 are structurally similar to that of FIGURES 1 and 2 with the exception of the particular form of the cushion structure and the shape of the retaining grooves. Like parts in the various embodiments have been supplied with the same reference numerals.

In the FIG. 3 construction, the cushion 13' has a circular cross section and is disposed completely within a groove 11' which is formed with straight and parallel sides, as shown. It will be noted that an annular spacer 14, preferably of aluminum or other suitable metal, is also seated in the groove 11 and is in contact with the cushion 13'. The spacer 14 projects beyond the outer face 16' of the piston and is adapted to have its outer planar face 15' contact the friction plate on sufficient movement of the piston toward the clutch pack 23. When the plates have made their flat-to-flat engagement and resist further movement, the cushion 13' will deform, cushioning the impact of piston 9 on the clutch pack 23 while absorbing part of the apply load.

In FIG. 4 the cushion of FIG. 1 is utilized in a straight-sided annular groove similar to that of FIG. 3 to produce a desired load-deflection curve and provide calibration of the friction disc pack for torque transmittal as will be later explained.

It will be understood that the cushions 13 and 13' may be bonded in their respective grooves through the use of a suitable adhesive, such as that commonly used to secure friction material to friction plates 27, if desired.

For ratio change, pressure oil is admitted to apply chamber 43 until the force on the apply face of piston 9 is slightly greater than the opposing force of return springs 33. The piston will then move in its housing toward the friction plate pack 23.

In the FIGS. 1 and 4 embodiments the cushion 13 will contact and begin to pack the friction plates while deflecting by bulging out at its sides. Since the spring rate of the cushion will gradually increase during this time the friction plates will slip and have gradually increasing torque-transmitting capacity. During this time the clutch plates will be in a dynamic phase of operation. As pressure in chamber 43 further increases spring rate increases and the piston will apply a greater mechanical force on the plate pack through the clutch. The tapered groove 11 of FIGS. 1–2, or the straight groove 11' of FIG. 4 fills with the material of the cushion as it changes shape when deflecting. After the cushion changes shape to conform to that of the groove further deflection is prevented by the walls of the groove; load on the friction pack will then rapidly increase as the face 16 of the piston bottoms on the pack 23 and the frictional forces between the plates will prevent their relative movement for static operation. Sun gear 53 is then completely clutched to drive shaft 1 for rotation therewith. When the pressure in chamber 43 is relieved the return springs 33 will move the piston to its off position and the cushion 13 returns to its relaxed position shown in FIG. 1.

The operation of the FIG. 3 embodiment is similar to that of FIGS. 1 and 4; however, instead of having the direct cushion-friction plate contact the spacer 14 is used for this purpose. As the friction plates are packed at low load the cushion 13' will initially deflect bulging out into the groove 11'. The spring rate of cushion 13' increases on increase in deflection similar to that described above. At low spring rates the friction plates will have a low torque-transmitting capacity. A further rise in pressure in pressure chamber 43 will be transmitted through the piston, cushion 13' and spacer 14 to the friction plates with decreasing deflection of the cushion and accordingly higher spring rates. At full piston apply loads the cushion 13' is deformed to an extent allowing the spacer to move completely into groove 11'. Spacer face 15' and piston face 16' are then coplanar and both load the clutch pack. Higher loads are thus transmitted to the friction plate for increased torque capacity.

Figure 5:
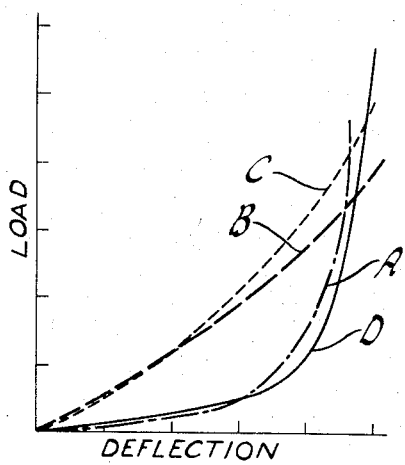
FIGURE 5 is a plot of load-deflection curves illustrating performance operation of certain embodiments of the invention.

FIG. 5 graphically illustrates the performance of the several above-described embodiments and further provides a comparison of these embodiments with each other and with an ideal unit. In this figure, curve D represents a desired load deflection curve of an ideal cushion for soft shifts. At light apply load this cushion will rapidly deflect and change in shape to absorb most of the apply load. The spring rate of the cushion while deflecting will slightly increase and in turn apply a slightly increasing calibrated load to the friction plate pack. This action continues to a point where further cushion deflection ceases or rapidly tapers off to end the dynamic operation of the friction plate pack. The cushion thus provides calibration of the unit for improved softer shifts where initial plate slippage is desired for smooth vehicle operation. Since the cushion has initially absorbed the apply force of the piston on the friction pack "shift feel" is substantially improved. After the cushion deflection is completed cushion spring rate is high and the cushion transmits high apply load to the friction plates for static operation in which full clutching or braking is desired for maximum efficiency.

In FIGURE 5, curve A is the load deflection curve for the preferred embodiment of FIGS. 1 and 2 and it will be seen that this curve closely approximates the desired curve D and that the preferred embodiment substantially operates in the manner stated above. Curve B represents the performance of the FIG. 4 embodiment and it will be appreciated that this curve, although acceptable, is not as desirable as the FIG. 1 embodiment since at initial low load, cushion deflection is comparatively low and the spring rate is accordingly higher and the shift is harsher and faster. This is due primarily to the fact that groove 11' of the FIG. 4 embodiment does not readily accommodate all of the material of the cushion 13 when it changes shape. Since cushion deflection is decreased and spring rates are higher, apply loads are greater. The performance of the FIG. 3 embodiment is represented by curve C which is similar to curve B and is for the stated reasons not as desirable as the embodiment of FIGS. 1 and 2. Furthermore, the shift is faster than that of FIG. 2 since at higher loads the cushion deflection is reduced even more than that of the FIG. 4 embodiment and, accordingly, spring rates are higher. Therefore, the FIG. 3 embodiment is not as desirable as that of the embodiment of FIG. 4.

Spring rate control through selection of cushion and groove shapes provides for improved shift calibration of a gear unit and thus substantially improves shifting for vehicle operation. For example, when a planetary gear unit is shifted from neutral to reverse drive the initial slippage caused by the slightly rising spring rate of the cushion as it is being deflected allows the friction plate pack to gradually bring on a reaction gear such as a ring gear of the unit. Reduced but gradually increasing torque is transmitted by the planetary output until the side walls of the groove provide increasing cushion support so that cushion deflection rapidly decreases and high loads are applied to the friction pack. When the reaction gear is completely grounded, the shift is completed with the planetary unit transmitting and multiplying all input torque.

It will be appreciated that other changes and modifications may be made to the above-described embodiments which are illustrative only, and it is therefore to be understood that applicant is not to be limited to the particular structure shown and described but to that which is set forth in the claims which follow.

I claim:

1. In a friction-drive-establishing device having a plurality of mutually engageable friction plates, movable motor means for applying a load to said members causing face-to-face engagement thereof, an elastomeric annular cushion, said motor means having an apply surface with a groove formed therein having a width substantially greater than the width of said cushion, said cushion being mounted in said groove and when relaxed having a portion extending beyond said apply surface, said cushion having a contact surface for initially applying a load to said plates on predetermined movement of said motor means toward said plates, said cushion when deflected into said groove having a slightly rising spring rate to condition said plates for a gradual rise in torque capacity, said cushion when deformed a predetermined amount having a rapidly rising spring rate thereby conditioning said plates for rapidly rising torque capacity on further increase in apply load.

2. In a friction unit having a plurality of friction plates engageable to connect relatively rotatable parts, movable motor means for moving said plates into face-to-face friction engagement by applying a load thereto, said motor means having an apply face formed with a groove therein having inwardly tapering walls, a resilient cushion of elastomeric material mounted in said groove to cushion the engagement of said motor means with said friction plates, said groove having space sufficient to accommodate all of said cushion when deformed in response to engagement of said friction plates by said motor means, said cushion initially having a gradually rising spring rate when deflected to condition said friction members for gradually increasing torque capacity and having a rapidly rising spring rate subsequent to completion of deflection to condition said friction members for high torque capacity.

3. The device defined in claim 2 wherein said cushion has a planar contact face for direct engagement with one of said friction plates to provide equally loading of said friction plates on predetermined movement of said motor means.

4. In a friction device having a plurality of friction members engageable to connect relatively rotatable parts, movable motor means for moving said friction members into face-to-face engagement by applying a load thereto, said motor means having a contact surface for directly engaging a first of said friction members and having a groove therein, a resilient cushion of elastomeric material disposed in said groove to cushion the engagement of said motor means and said first friction member while transmitting apply load to said friction members, said cushion when relaxed having a continuous and planar contact surface offset from the contact surface of said motor means for initially contacting said first friction member in response to predetermined movement of said motor means toward said friction member, said contact surfaces of said cushion and said motor means being substantially coplanar when said contact surface of said motor means engages said first friction member.

5. In a friction device having a plurality of friction members engageable to connect relatively rotatable torque transmitting parts, movable motor means for engaging and moving said friction members into face-to-face engagement by applying a load thereto, said motor means having an annular groove therein, an annular elastomeric cushion disposed in said groove, an annular spacer positioned in said groove between said cushion and said friction members for contacting one of said friction members subsequent to sufficient movement of said motor means toward said friction members and deflecting said cushion, said cushion being operative while deflecting to transmit a gradually increasing apply load to said friction members through said spacer and being operative after deflecting to transmit a rapidly increasing apply load to said friction members.

6. The device defined in claim 5 wherein said motor means has a planar face for directly contacting said one of said friction members, said spacer having an annular contact surface initially projecting beyond said face of said motor means and subsequently coplanar with said face of said motor means when the deflection of said cushion is completed, and said groove providing a space to completely contain said cushion when completely deflected by contact of said motor means and said one of said friction members.

7. In a friction unit having a plurality of friction plates selectively engageable to connect relatively rotatable parts together, movable motor means adjacent to said plates for moving said plates into face-to-face frictional engagement by applying a load thereto, said motor means having an apply face, said apply face having internal spaced side walls therein forming a groove therein, an elastic cushion member having side walls seated in said groove for transmitting apply load from said motor means to said friction plates, at least one of said side walls of said groove being spaced from the adjacent side wall of said cushion member to initially provide a space for accommodating cushion member deflection when said plates are moved into face-to-face frictional engagement and to subsequently limit cushion deflection thereby controlling the spring rate of said cushion member and the transmittal of load from the motor means through the cushion member to the friction plates.

8. A friction unit having a plurality of friction plates selectively engageable to connect relatively rotatable parts, motor means adjacent the plates and movable in a direction to force said plates into face-to-face frictional engagement to connect the relatively rotatable parts, said motor means having an apply face with a groove therein, a cushion member disposed in said groove, a contact member seated on said cushion and extending outwardly from the apply face of said motor means, said contact member deflecting said cushion member in response to predetermined movement of said motor means when moving said plates into face-to-face frictional engagement, said groove providing space to accommodate initial cushion deflection and providing means to subsequently limit cushion deflection to thereby control the spring rate of said cushion and transmittal of apply force from said motor means to said plates.

9. In a friction unit having friction plates selectively engageable to connect relatively rotatable parts, motor means for moving said plates into frictional engagement by applying a load thereto, said motor means having a face with a groove therein, a resilient cushion disposed in said groove having a portion which extends outwardly therefrom when said cushion is relaxed, said groove having wall means with one portion contacting one portion of said cushion and with another portion spaced from another portion of said cushion to provide a space adjacent to said cushion to accommodate a predetermined degree of cushion deformation and said another portion of said wall means limiting the deformation to said predetermined degree of deformation to provide a changing degree of support for said cushion varying with the apply load to control the rate of change of the apply load with changes in the apply load.

10. The friction unit of claim 8 in which said resilient cushion is of an elastomeric material.

11. The friction unit of claim 9 wherein said resilient cushion is annular and is formed with a planar contact surface.

12. In a friction unit, first and second relatively rotatable parts, separate friction means mounted on each of said parts engageable to frictionally connect said parts, motor means for applying a load to said friction means so that they frictionally engage and slip in certain conditions of operation and engage without slipping in another condition of operation, said motor means having an apply face with a groove therein, a cushion of elastomeric material disposed in said groove and having a part which projects beyond the apply face of said motor means when said cushion is relaxed, said groove having wall means having one portion contacting one portion of said cushion and said wall means having another portion transverse to said one portion of said wall means spaced from another portion of said cushion in the relaxed condition for providing a space adjacent to said cushion to receive the cushion when deformed to the extent to permit the direct engagement of said apply face and one of said friction means.

References Cited
UNITED STATES PATENTS

| | | |
|---|---|---|
| 2,244,169 | 6/1941 | Miller. |
| 2,872,794 | 2/1959 | Slomer _____ 192—85 X |
| 3,285,379 | 11/1966 | Helquist _____ 192—85 |

MARK M. NEWMAN, *Primary Examiner.*

ARTHUR T. McKEON, *Examiner.*